(12) United States Patent
Grandmaitre et al.

(10) Patent No.: US 7,761,913 B2
(45) Date of Patent: Jul. 20, 2010

(54) METHOD FOR SELECTING AN ACCESS POINT NAME (APN) FOR A MOBILE TERMINAL IN A PACKET SWITCHED TELECOMMUNICATIONS NETWORK

(75) Inventors: Nicholas Grandmaitre, Montreal (CA); Claude LeFrançois, Laval (CA)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 1295 days.

(21) Appl. No.: 11/124,208

(22) Filed: May 9, 2005

(65) Prior Publication Data

US 2006/0168655 A1 Jul. 27, 2006

Related U.S. Application Data

(60) Provisional application No. 60/645,747, filed on Jan. 24, 2005.

(51) Int. Cl.
*G06F 15/16* (2006.01)
(52) U.S. Cl. ........................................ 726/12
(58) Field of Classification Search .................. 726/12
See application file for complete search history.

(56) References Cited

U.S. PATENT DOCUMENTS

| 2004/0066769 A1* | 4/2004 | Ahmavaara et al. | 370/338 |
| 2004/0121779 A1* | 6/2004 | Muhonen et al. | 455/453 |
| 2005/0153683 A1* | 7/2005 | Gustafsson | 455/411 |
| 2005/0154780 A1* | 7/2005 | Sarja et al. | 709/203 |

FOREIGN PATENT DOCUMENTS

| WO | WO 2004/012433 | 2/2004 |
| WO | WO 2004/032554 | 4/2004 |
| WO | WO 2004/034720 | 4/2004 |

OTHER PUBLICATIONS

PCT Search Report dated Jun. 28, 2006 from corresponding application PCT/IB2006/050212.
C. Rigney et al., Remote Authentication Dial in User Service (RADIUS), Network Working Group, RFC 2865, Jun. 2000.
3GPP TS 29.061, version 4.9.0 Release 4, Digital cellular telecommunications system (Phase 2+); Universal mobile telecommunications system (UMTS); Interworking between the public land mobile network (PLMN) supporting packet based services and packet data networks (PDN), Dec. 2003.

* cited by examiner

*Primary Examiner*—Kambiz Zand
*Assistant Examiner*—Aubrey H Wyszynski
(74) *Attorney, Agent, or Firm*—Alex Nicolaescu; Ericsson Canada Inc.

(57) ABSTRACT

The present invention is a method for providing network access to a Mobile Terminal (MT) in a packet switched telecommunications network. An access-request is sent from a Gateway server to an Authentication, Authorization, and Accounting (AAA) server for requesting network access for the MT. The access-request includes an Access Point Name (APN) for identifying a selected APN and a MT identity parameter for identifying the MT. The AAA determines whether or not the MT is authorized on the selected APN. If the MT is not allowed on the selected APN, the Gateway server selects a subsequent APN from a list of selectable APNs based on a generic APN. However, if the MT is allowed on the selected APN, the AAA server sends an access-accept message for indicating to the Gateway server that the MT is allowed on the APN combination.

15 Claims, 4 Drawing Sheets

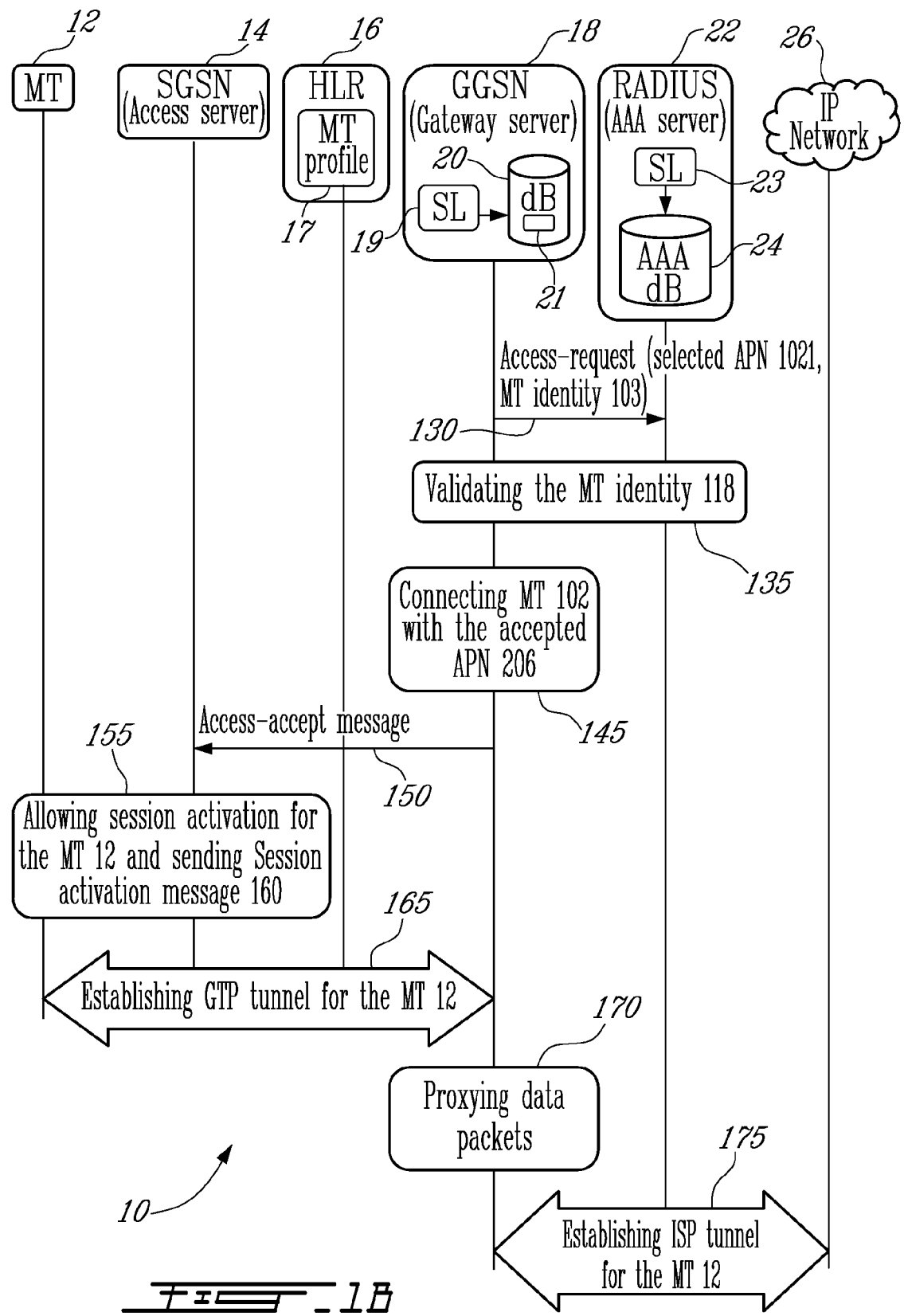

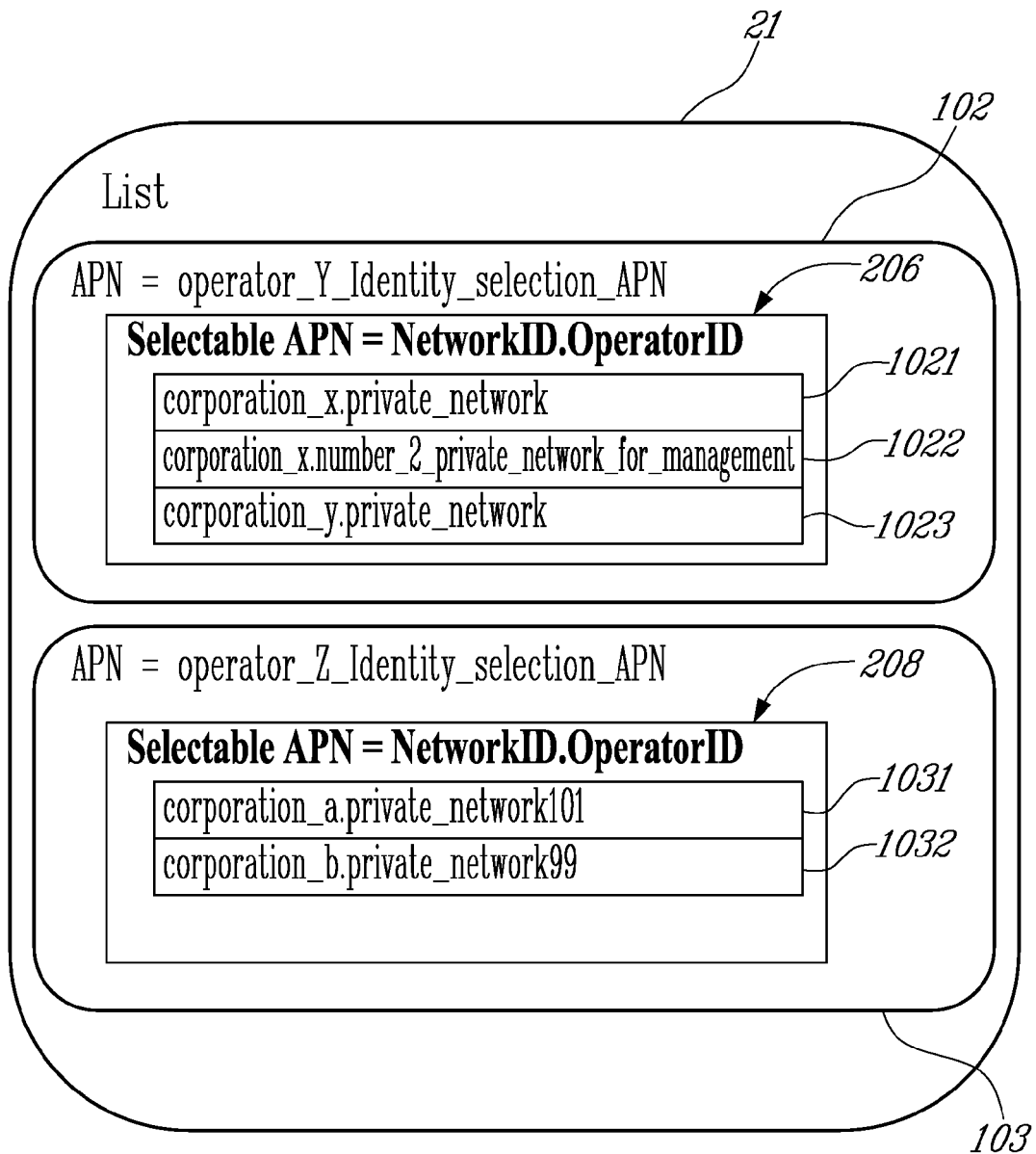

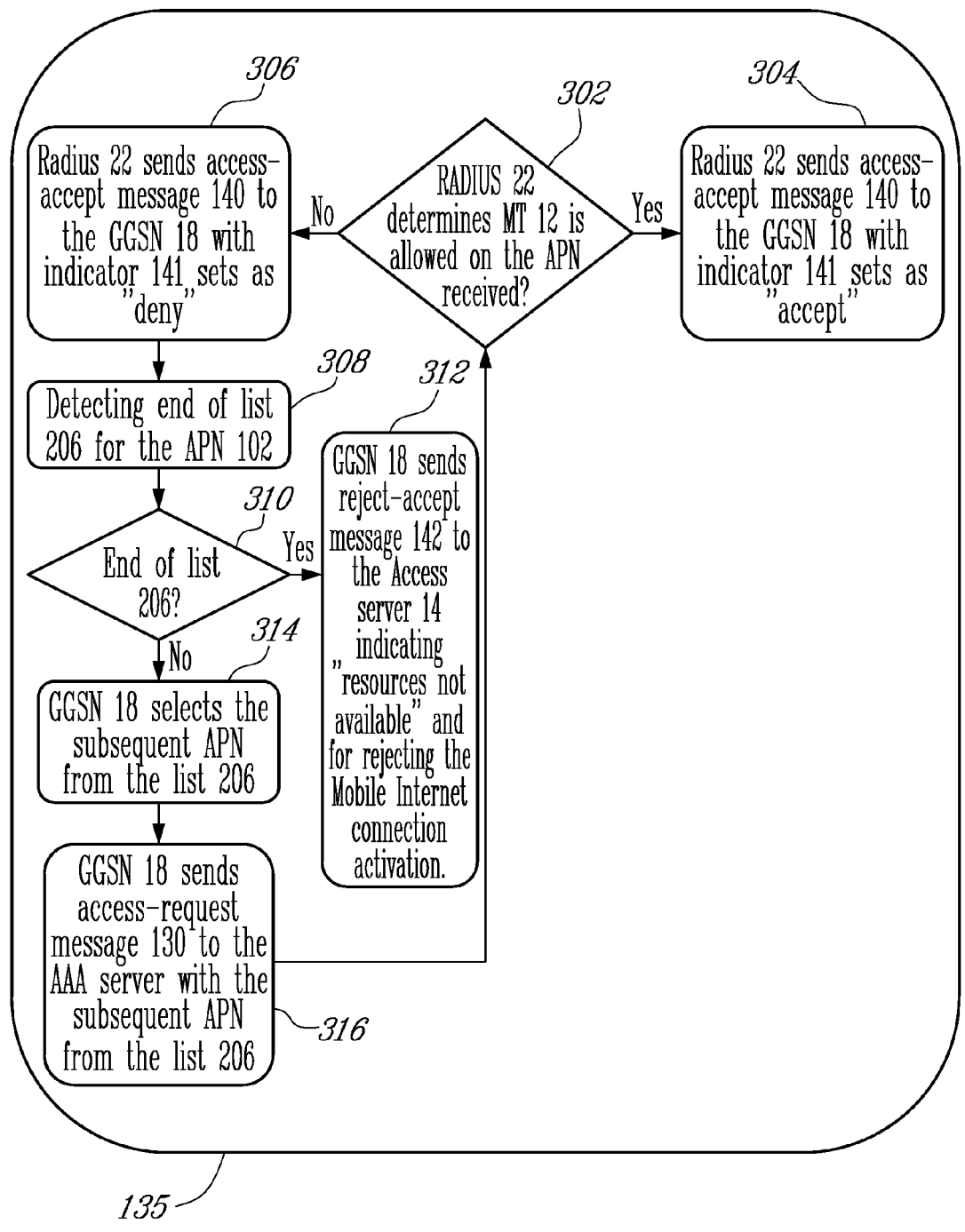

METHOD FOR SELECTING AN ACCESS POINT NAME (APN) FOR A MOBILE TERMINAL IN A PACKET SWITCHED TELECOMMUNICATIONS NETWORK

PRIORITY STATEMENT UNDER 35 U.S.C S.119 (e) & 37 C.F.R. S.1.78

This non-provisional patent application claims priority based upon the prior U.S. provisional patent applications entitled "IMSI or MSISDN based APN selection", application 60/645,747 filed Jan. 24, 2005, in the name of Nicholas Grandmaitre and Claude Lefrancois.

BACKGROUND OF THE INVENTION

1. Field of the Invention

The present invention relates to a method for providing network access and packet data services to a Mobile Terminal (MT) in a packet switched telecommunications network.

2. Description of the Related Art

Network operators handle a packet switched telecommunications network configuration for providing services over multiple Mobile Terminal (MT) brands. If MTs have access to multiple services or if different users need to access different restricted IP networks with their MTs, the network configuration becomes more complex. Such a network configuration involves high costs, updates, troubleshooting, technical support for users and network operators.

For example, in a packet switched network such as a General Packet Radio Service (GPRS) network a Gateway GPRS Support Node (GGSN) acts as a gateway between the GPRS network and an IP network. The IP network may be a public shared network and may have only one Wireless Application Protocol (WAP) server to which MTs from the GPRS network access the IP network. The IP network may also be a restricted private IP network only accessible by authorized MT. When a user located in the GPRS network wishes to have wireless access to the restricted private network the GGSN shall be the gateway allowing or denying access. The network access for a MT is provided by authenticating a MT based on a username and a password. This solution causes configuration problems and involves end user support for their MTs, since different brands of MTs can be used to access the restricted network.

A possible solution is to provide to the MT an user@apnname for selecting a service/network and for allowing the MT to access a restricted private network through the GPRS network. However, this solution requires configuring the user@apnname in the MT. Therefore, the problems of configuration of multiple MTs of different brands is still not solved. For that reason, there is a need to decrease the configuration on MTs that wishes to access a restricted private network. The present invention provides a solution to that problem.

SUMMARY OF THE INVENTION

It is therefore one broad object of this invention to provide a method for providing network access to a Mobile Terminal (MT) in a packet switched telecommunications network, the method comprising steps of:

receiving at an Authentication, Authorization, and Accounting (AAA) server from a Gateway server an access-request message for requesting network access for the MT, the access-request including an Access Point Name (APN) for identifying a selected APN and a MT identity parameter for identifying the MT;

determining at the AAA server, based on the selected APN and the received MT identity, that the MT is allowed on the selected APN:

if the MT is not allowed on the selected APN, the AAA server sends an access-accept message for indicating to the Gateway server that the MT is not allowed on the APN:

selecting at the Gateway server a subsequent APN from a list of selectable APNs;

if the MT is allowed on the selected APN, the AAA server sends an access-accept message for indicating to the Gateway server that the MT is allowed on the APN combination.

It is therefore another broad object of this invention to provide a method for selecting an APN for network access to a MT in a packet switched telecommunications network, wherein the step of determining includes steps of:

receiving at a Gateway server from an Access server an access-request message for requesting network access for the MT, the access request including a generic APN marked for selecting the APN from the list of selectable APN;

retrieving at the Gateway server a list of selectable APN;

selecting at the Gateway server an APN for specifying routing information for the MT; and sending from the Gateway server to an Authentication, Authorization, and Accounting (AAA) server an access-request for requesting network access for the MT, the access-request including an APN for identifying the selected APN and a MT identity parameter for identifying the MT.

It is therefore another broad object of this invention to provide an AAA server for authenticating a MT, the AAA server comprising:

a Service Logic (SL) adapted for:

receiving from a Gateway server an access-request message for requesting network access for the MT, the access-request including an APN for identifying a selected APN and a MT identity parameter for identifying the MT;

determining, based on the selected APN and the received MT identity, that the MT is allowed on the selected APN combination:

if the MT is not allowed on the selected APN, the SL sends an access-accept message for indicating to the Gateway server that the MT is not allowed on the APN; and if the MT is allowed on the selected APN, the SL sends an access-accept message for indicating to a Gateway server that the MT is allowed on the APN.

It is therefore another broad object of this invention to provide a Gateway server for providing network access for a MT in a packet switched network, the Gateway server comprising:

a database for storing a list of selectable APNs for a generic APN.

a SL adapted for:

receiving an access-request message for requesting network access for the MT, the access request including the generic APN marked for selecting an APN from the list of selectable APN;

determining that the generic APN marked for selecting a routing APN and comprises a list of selectable APN; and wherein the SL retrieves the list of selectable APNs from the database, selects an APN for specifying routing information for the MT and selects, responsive to a reception of an access-accept message for indicating that the MT is not allowed on the APN, a subsequent APN from the list of selectable APNs.

BRIEF DESCRIPTION OF THE DRAWINGS

For a more detailed understanding of the invention, for further objects and advantages thereof, reference can now be made to the following description, taken in conjunction with the accompanying drawings, in which:

FIGS. 1A and 1B are a nodal operation and signal flow diagrams illustrating a flow of messages of a method for providing network access to a Mobile Terminal (MT) in a packet switched telecommunications network in accordance to the invention;

FIG. 1C is a schematic diagram illustrating a list of selectable Access Point Names (APNs) marked for selecting a routing APN for the MT in accordance to the invention; and FIG. 1D is a flow chart and signal flow diagrams illustrating a method for selecting a routing Access Pont Name (APN) for providing network access to the MT in the packet switched telecommunications network in accordance to the invention.

DETAILED DESCRIPTION OF THE PREFERRED EMBODIMENTS

Figure 1A:
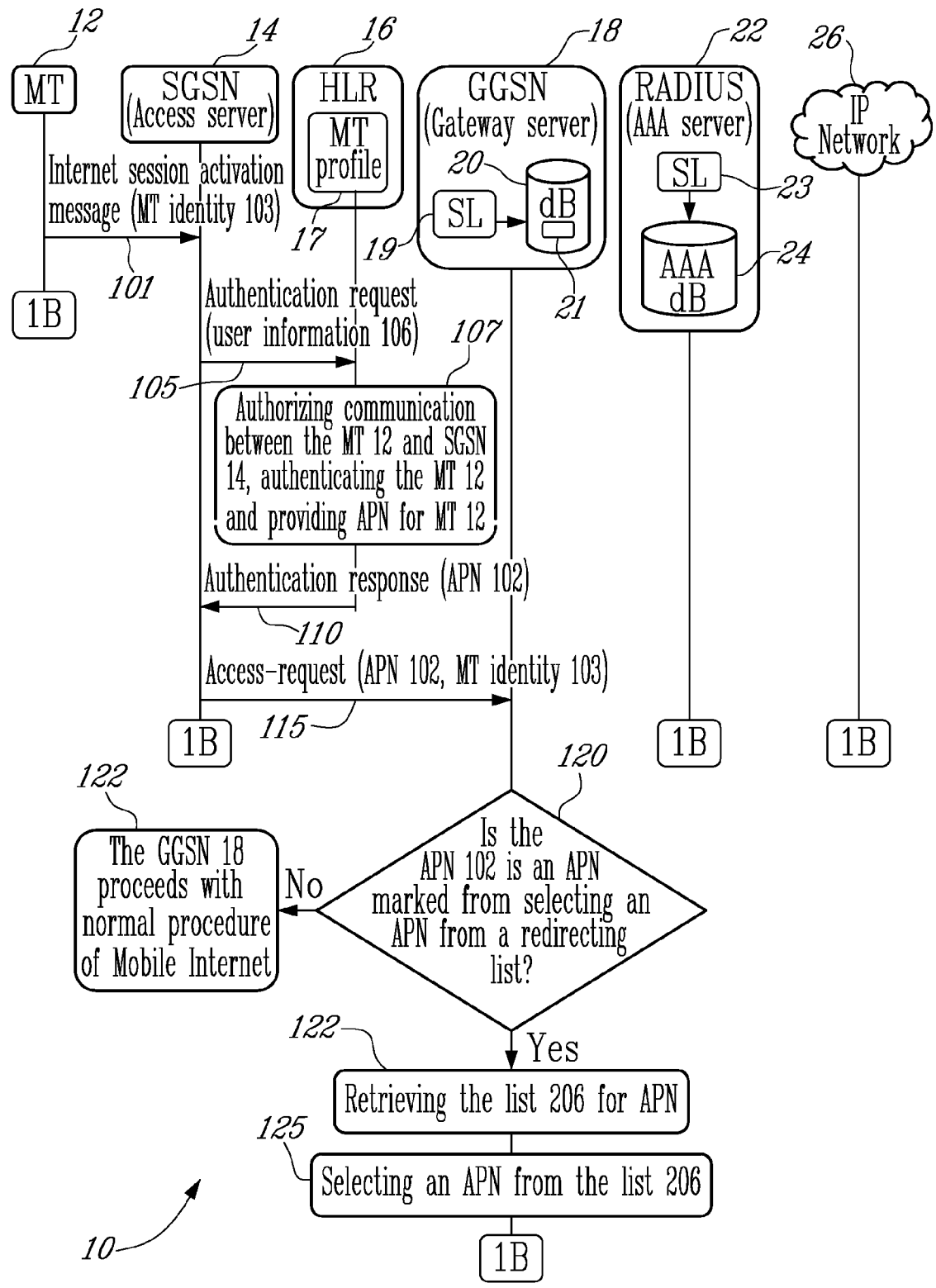

Reference is now made to FIGS. 1A and 1B, which describes a nodal operation and signal flow diagrams illustrating a flow of messages of a method for providing network access to a Mobile Terminal (MT) 12 in a packet switched telecommunications network 10 in accordance to the invention. FIG. 1B is the continuation of FIG. 1B. The MT 12 may receive packet data services such as email, corporate data, voice, short message service (SMS) messages, Web-based information and paging services from an Internet Protocol (IP) network 26 while roaming the packet switched telecommunications network 10. The IP network 26 may be a public network such as Internet or any restricted private IP network accessible by a certain number of authorized MTs. It can be understood that the number of network elements in FIGS. 1A and 1B is only given as an example and is not only limited number shown in FIGS. 1A and 1B.

The concept of a General Packet Radio Service (GPRS network) is preferably described in the present invention. However, it can be understood that the present invention is not only limited to GPRS networks, but can also be applied to other third generation (3G) packet switched data telecommunications networks such as a Wideband Code Division Multiple Access (WCDMA) network, a Global System for Mobile Communications/Enhanced Data for GSM Evolution (GSM/EDGE) or a High Speed Packet Data Access (HSPDA) network.

The packet switched telecommunications network 10 comprises an Access Server 14 such as a Serving GPRS Serving Node (SGSN) for delivering of data packets from and to MTs within its geographical service area. The Access server 14 handles the data traffic from and to MTs in a geographical service area. The Access server 14 interacts with a Gateway server 18 such as a Gateway GPRS Support Node (GGSN) for allowing IP network access to MTs.

The Gateway server 18 comprises a database 20 for storing a list 21 of generic Access Point Names (APNs) marked for selecting a routing APNs based on an MT identity of an MT. Reference is now made to FIG. 1C, which is a schematic diagram illustrating the list 21 of generic APNs marked for selecting a routing APN in accordance to the invention. The list 21 comprises at least one APN, which in turn includes a list of selectable APNs. In FIG. 1C, the list 21 comprises two APNs 102 and 103. For instance, the name of APN 102 may be as follows operator_Y_identity_selection and the name of APN 103 may be as follows operator_Z_identity_selection.

It can be appreciated that the number APN 102 and the number of selectable APNs in the list 206 is not limited to the number of FIG. 1C and the list 21 may comprise more or less than illustrated. For instance, the APN 102 comprises a redirection list 206 where routing APN 1021, APN 1022 and APN 1023 are listed and the APN 103 comprise a redirection list 208 where APN 1031 and APN 1032 are listed. APNs 102 and 103 are marked for selecting and redirecting data packets on a routing APN listed under redirection list 206 and 208 that contain a selectable routing APN. APN 1021, APN 1022, APN 1023, APN 1031 and APN 1032 provide routing information to the Access server 14 and to the Gateway server 18 for MT 12.

An APN is used to describe a service or an access to a private restricted network and consists of two parts: Network ID and Operator ID. The Network ID identifies an external service requested by the MT 12 and the Operator ID specifies routing information. If the MT 12 attempts to connect to the network 26 it is assumed that it will be connected to an APN and that APN has a one-to-one relationship to the IP network 26. The Gateway server 18 further comprises a Service Logic (SL) 19 for accessing a database 20 and retrieving from the database 20 a list for a generic APN parameter. The SL 19 is adapted to receive and send messages for the Gateway server 18 in the packet switched telecommunications network 10. The SL 19 also operates the Gateway server 18 and can be a software, a hardware or any combination thereof.

The Gateway server 18 supports routing functions in a GPRS network and acts as an Internet Protocol (IP) router. The Gateway server 18 also applies firewall and filtering functionality for protecting the integrity of the packet switched telecommunications network 10 and provides billing information and sends access-requests for MTs to an Authentication, Authorization, and Accounting (AAA) server 22.

The AAA server 22 is a server program that handles access-requests and provides AAA services. The AAA server 22 interacts with the packet switched telecommunications network 10 and more particularly with Access and Gateway servers and with databases that contain MT information. The current standard by which devices or applications communicate with an AAA server 22 is the Remote Authentication Dial-In User Service (RADIUS). RADIUS is defined in Request for Comments (RFC) 2865, Internet Engineering Task Force (IETF), June 2000. More precisely, the RADIUS is a client/server protocol and software that enables the Access server 14 and Gateway server 18 to communicate with the AAA server 22 for authenticating dial-in MTs and authorizing their access to a requested network or service. RADIUS allows a network operator of the packet switched telecommunications network 10 to maintain MT profiles and information in an AAA database 24. The AAA server 22 is also used for billing purposes. Alternatively, the AAA server 22 may be collocated with the Gateway server 18.

The AAA server also comprises a SL 23 for accessing the AAA database 24. The SL 23 receives and sends messages from and to other network elements such as the Access server 14 and the Gateway server 18. The SL 23 is adapted to receive and send messages for the AAA server 22 in the packet switched telecommunications network 10. The SL 23 also operates the AAA server 22 and can be a software, a hardware or any combination thereof.

In FIG. 1A, the MT 12 initiates a wireless Internet activation to connect to the IP network 26, which can be its corporate restricted private IP network. The Internet session establishment starts when the MT 12 sends an Internet session activation message 101 to the Access server 14. The message 101 comprises a MT identity parameter 103 for identifying the MT 12. The MT identity 103 can be an International Mobile Subscriber Identity (IMSI) or a Mobile Station International Subscriber Directory Number (MSISDN). The IMSI is a unique identifier allocated to each mobile subscriber in a GSM and Universal Mobile Telecommunications System (UMTS). It consists of a Mobile Country Code (MCC), a Mobile Network Code (MNC) and a Mobile Station Identification Number (MSIN). The MSISDN is the standard international telephone number used to identify a given subscriber. The number is based on the International Telecommunications Union-Telecommunication Standardization Sector E.164 standard (ITU-T).

Following the reception of the message 101, the Access server 14 requests authentication and an APN for the MT 12 to a Home Location Register (HLR) 16, which stores a MT profile 17 of MT 12. For doing so, the Access Server 14 sends an authentication request 105 with MT information 106, which may consists of authentication parameters. When receiving the message 105, the HLR 16 authenticates the MT 12, authorizes further communications between the MT 12 and the Access server 14 and provides a generic APN marked for selecting a routing APN for the MT (step 107). The HLR 16 sends an authentication response message 110 for responding to the authentication request 105. The message 110 includes a default APN 102 for the MT 12 based on the MT profile 17 of the MT 12. The default APN 102 identifies a generic APN marked for selecting a routing APN on which the MT 12 can access a restricted network or a service as determined from its MT profile 17. The generic APN 102 is an APN listed in the Gateway server 18. Next, the Access server 14 sends to the Gateway server 18 an access-request message 115, which comprises the APN 102 and the MT identity 103, for requesting network access for the MT 12.

Upon reception of the message 115, the Gateway server 18 determines that the generic APN 102 does not comprise routing information for the MT 12 and is thus marked for selecting a routing APN (step 120). If at step 120, the Gateway server 18 determines that the APN 102 comprises routing information and is thus a routing APN such as for example one of the selectable APNs listed on list 206 and 208, a normal procedure of Mobile Internet connection activation is performed (step 122).

If the APN 102 does not comprise routing information and is marked for selecting a routing APN, the Gateway server 18 and more particularly the SL 19 retrieves from the list 206 for selecting an APN for the MT 12. At step 125, the Gateway server 18 selects the first APN 1021 on the list 206 of the generic APN 102 and sends to the AAA server 22 an access-request message 130 for requesting network access for the MT 12. The access-request message 130 includes the first selected APN 1021 and the MT identity parameter 103. Upon reception of the message 130, the AAA server 22 validates the APN 1021 and the MT identity 103. The SL 23 determines and verifies if the MT 12 is allowed on the APN 1021 by comparing the combination of the APN 1021 and the MT identity 103 with the information in the database 24 (step 135).

Reference is now made to FIG. 1D, which is a flow chart and signal flow diagrams illustrating a method for selecting a routing APN for providing network access to the MT 12 in the packet switched telecommunications network in accordance to the invention. FIG. 1D describes in more details step 135 of FIG. 1B. After receiving the message 130, the AAA server 22 verifies if the MT 12 is allowed to use the APN 1021. The verification is performed by the SL 23, which uses the MT identity 103 and the information in the AAA database 24 or alternatively an external database (not shown) for determining at step 302 whether not the MT 12 is allowed to used the APN 1021. An operator of the packet switched telecommunications network 10 can choose to allocate a list of APNs to the MT 12 and to store the list in the AAA server 22. Thus, the present invention allows an operator of the packet switched network 10 to provide access to the MT 12 by authenticating the MT 12 based on the MT identity 103.

If the MT 12 is allowed on the APN 206 at step 302, the AAA server 22 sends an access-accept message 140 to the Gateway server 18 at step 304. The message 140 includes an indicator 141 sets as accept for indicating to the Gateway server 18 that the MT 12 is allowed on the APN 1021. At step 145, the Gateway server 18 connects the MT 12 with the selected APN 1021 and sends an access-accept message 150 to the Access server 14. Following this, the Access server 14 allows the session activation for the MT 12 and sends an activation message 155 to the MT 12, in order to enable packet data traffic for the MT 12

During the Internet session, a GPRS Tunneling Protocol (GTP) tunnel 165 is established between the MT 12, the Access server 14 and the Gateway server 18 and an Internet Service Provider (ISP) tunnel 175 is also established between the Gateway server 18 the AAA server 22 and the IP network 24 for providing access to a service or private IP network to the MT 12. The Gateway server 18 then proxies the data packets sent from and to the MT 12. Afterwards, the Gateway server 18 encapsulates end decapsulates the data packets in order to enable transmission of data packets from and to the MT 12 on different tunneling protocols.

However, at step 302, the MT 12 may not be allowed on the APN 1021. If this is the case, the AAA server 22 sends an access-accept message 140 with the indicator 141 sets as "deny" to the Gateway server 18 (at step 306). When the access-accept message 140 with "deny" access on the selected APN 1021 is received, the Gateway server 18 detects if the list 206 contain another selectable APN (step 308). At step 310, if the list 206 is does not comprises another selectable APN, the Gateway server 18 returns a reject-message 142 to the Access server 14 indicating that "resources not available" and thus rejecting the Mobile Internet connection activation request 101 (312). As a consequence, the Gateway server 18 may have tried all APNs on the list 206 and reach the end of the list 206 without providing access to the MT 12.

If at step 310, the list 21 comprises further selectable APN, the Gateway server 18 selects a subsequent routing APN from the list 206 (step 314) and sends to the AAA server 22 another access-request 130 that includes the subsequent APN, which is APN 1022 and the MT identity 103 (step 316).

More particularly, step 135 is performed until the end of list 206 of selectable APNs is reached or until the MT 12 is allowed on a selectable APN. For these reasons, the Gateway server 18 selects a selectable APN from the list 206 of the generic APN 102 and sends to the AAA server the selected APN until the end of list 206 is reached or until it receives an access accept message 140 with the indicator 141 sets as "accept". The Gateway server 18 may keep statistics of the most used selectable APN and selects the APN in that order, instead of sending the selectable APNs in the order of which they appear on the list 206.

The present invention then minimizes configuration on MTs while allowing transparent network access to services for the MT 12 on the IP networks 26. The present invention further minimizes configuration maintenance of MTs from different brands that may be used in the packet switched network 10. For instance, a user may insert his Security Identity Module (SIM) card in any MT brand and access a private corporate IP network without the need of a particular configuration.

It can be understood that some messages and therefore some parameters sent from and to the MT 12 in the packet switched telecommunications network 10 are not mentioned nor described for clarity reasons. Also some messages and therefore some parameters sent between network elements such as the Access server 14, the HLR 16, the Gateway server 18 and the AAA server 22 in the packet switched telecommunications network 10 are omitted for clarity reasons. More particularly, it should also be understood that FIGS. 1A-1D each depicts a simplified packet switched network 10, and that many other nodes have been omitted for clarity reasons only.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for providing network access to a Mobile Terminal (MT) in a packet switched telecommunications network, the method comprising steps of:
   receiving at an Authentication, Authorization, and Accounting (AAA) server from a Gateway server an access-request message for requesting network access for the MT, the access-request including an Access Point Name (APN), selected from a list of selectable APNs included in a generic APN marked for selecting a routing APN and a MT identity parameter for identifying the MT:
   determining at the AAA server, based on the selected APN and the received MT identity, whether the MT is allowed on the selected APN:
   if the MT is allowed on the selected APN:
      sending from the AAA server to the Gateway server an access-accept message for indicating that the MT is allowed on the APN combination;
   if the MT is disallowed on the selected APN:
      sending from the AAA server to the Gateway server an access-accept message for indicating that the MT is disallowed on the APN; and
      selecting at the Gateway server a subsequent APN from the list of selectable APNs included in the generic APN.

2. The method of claim 1, wherein the method executes the following steps prior to the steps of claim 1:
   sending from an Access server to the Gateway server an access-request message for requesting network access for the MT, the access request including the generic APN marked for selecting the APN from the list of selectable APN;
   retrieving at the Gateway server the list of selectable APNs included in the generic APN;
   selecting at the Gateway server an APN for specifying routing information for the MT; and
   sending from the Gateway server to the AAA server an access-request for requesting network access for the MT, the access-request including the APN selected for specifying routing information for the MT and a MT identity parameter for identifying the MT.

3. The method of claim 2, wherein the step of receiving includes a step of:
   performing a normal procedure of Mobile Internet connection activation if the Gateway server determines that the generic APN comprises routing information.

4. The method of claim 2, wherein the method further comprises steps of:
   connecting the MT on the selected APN;
   sending from the Gateway server to the Access server an access accept message for allowing the Internet session activation;
   establishing a General Packet Radio Service (GPRS) Tunneling Protocol (GTP) for the MT;
   proxying data packets for the MT; and
   establishing an Internet Service Provider (ISP) tunnel for the MT.

5. The method of claim 1, wherein the step of selecting is performed until the end of the list of selectable APNs included in the generic APN is reached.

6. The method of claim 1, wherein the step of selecting is performed until the Gateway server receives an access-accept message with an indicator set as accept.

7. A method for selecting an Access Point Name (APN) for network access to a Mobile Terminal (MT) in a packet switched telecommunications network, the method comprising steps of:
   receiving at a Gateway server from an Access server an access-request message for requesting network access for the MT, the access request including a generic APN marked for selecting a routing APN selected from a list of selectable APNs included in the generic APN;
   retrieving at the Gateway server the list of selectable APNs;
   selecting at the Gateway server an APN, from the list of selectable APNs included in the generic APN, for specifying routing information for the MT; and
   sending from the Gateway server to an Authentication, Authorization, and Accounting (AAA) server an access-request for requesting network access for the MT, the access-request including the APN selected for specifying routing information for the MT and a MT identity parameter for identifying the MT.

8. The method of claim 7, wherein the step of selecting includes a step of:
   selecting an APN for specifying routing information for the MT until the end of the list of selectable APNs included in the generic APN is reached.

9. The method of claim 7, wherein the step of selecting includes a step of:
   selecting an APN for specifying routing information for the MT until the Gateway server receives an access-accept message with an indicator set as accept.

10. The method of claim 7, wherein the step of receiving includes a step of:
    performing a normal procedure of Mobile Internet connection activation if the Gateway server determines that the generic APN comprises routing information.

11. The method of claim 7, wherein the method further comprises step of:
    connecting the MT on the selected APN;
    sending from the Gateway server to the Access server an access-accept message for allowing the Internet session activation;
    establishing a General Packet Radio Service (GPRS) Tunneling Protocol (GTP) for the MT;
    proxying data packets for the MT; and
    establishing an Internet Service Provider (ISP) tunnel for the MT.

12. A Gateway server for providing network access for a Mobile Terminal (MT) in a packet switched network, the Gateway server comprising:
- a database for storing a list of selectable APNs included in a generic APN;
- a Service Logic (SL) adapted for:
- receiving an access-request message for requesting network access for the MT, the access request including the generic APN marked for selecting an APN from the list of selectable APNs included in the generic APN;
- determining that the generic APN marked for selecting the routing APN comprises the list of selectable APNs; and
- wherein the SL retrieves the list of selectable APNs from the database, selects an APN for specifying routing information for the MT and selects, responsive to a reception of an access-accept message for indicating that the MT is disallowed on the selected APN, a subsequent APN from the list of selectable APNs included in the generic APN.

13. The Gateway server of claim 12, wherein the SL is further adapted for:
- sending to an Authentication, Authorization, and Accounting (AAA) server an access-request for requesting network access for the MT, the access-request including an APN for identifying the selected APN and a MT identity parameter for identifying the MT.

14. The Gateway server of claim 12, wherein the SL is further adapted for:
- performing a normal procedure of Mobile Internet connection activation if the Gateway server determines that the generic APN comprises routing information.

15. The Gateway server of claim 12, wherein the SL is further adapted for:
- selecting an APN for specifying routing information for the MT until the end of the list of selectable APNs included in the generic APN is reached.

* * * * *